(12) United States Patent
Gaudl

(10) Patent No.: US 7,411,035 B2
(45) Date of Patent: Aug. 12, 2008

(54) ACRYLATED NATURAL RESINS

(75) Inventor: Kai-Uwe Gaudl, Hohen Neuendorf (DE)

(73) Assignee: Sun Chemical Corporation, Parsippany, NJ (US)

( * ) Notice: Subject to any disclaimer, the term of this patent is extended or adjusted under 35 U.S.C. 154(b) by 234 days.

(21) Appl. No.: 11/284,625

(22) Filed: Nov. 23, 2005

(65) Prior Publication Data

US 2006/0079666 A1    Apr. 13, 2006

Related U.S. Application Data

(62) Division of application No. 10/423,400, filed on Apr. 25, 2003, now Pat. No. 7,001,981.

(51) Int. Cl.
*C09F 1/00* (2006.01)
(52) U.S. Cl. .................. 530/210; 530/212; 530/214; 530/215; 530/217; 530/221
(58) Field of Classification Search ......... 530/212–215, 530/221
See application file for complete search history.

(56) References Cited

U.S. PATENT DOCUMENTS 4,294,936 A * 10/1981 Korpman ............... 525/93
4,532,300 A    7/1985 Lenz et al. ............ 525/124

FOREIGN PATENT DOCUMENTS

| DE | 19902685 | | 8/2000 |
| EP | 0197682 | | 10/1986 |
| EP | 0426085 | | 5/1991 |
| EP | 0625529 | | 11/1994 |
| JP | 58-043262 | | 9/1984 |
| JP | 58-160313 | | 3/1985 |
| JP | 05155164 A | * | 6/1993 |
| JP | 6256418 | | 9/1994 |
| JP | 2000290377 A | * | 10/2000 |
| WO | WO 87/04448 | | 1/1987 |
| WO | WO 89/02452 | | 3/1989 |

* cited by examiner

*Primary Examiner*—Irina S Zemel
(74) *Attorney, Agent, or Firm*—Dickstein, Shapiro, LLP.

(57) ABSTRACT

An acrylated resin prepared by mixing a hydroxyalkyl acrylate and an isocyanate and reacting said mixture with a resin containing one or more hydroxyl functional groups and derived from a natural product.

13 Claims, No Drawings

ACRYLATED NATURAL RESINS

This application is a Divisional of U.S. patent application Ser. No. 10/423,400 filed Apr. 25, 2003 now U.S. Pat. No. 7,001,981 entitled "Acrylated Natural Resins".

BACKGROUND OF THE INVENTION

1. Field of the Invention

This invention relates to methods of acrylating naturals resins. The invention also relates to energy curable resin compositions for printing inks.

2. Description of the Related Art

Resins, derived from natural products for example rosin esters are widely used as printing ink vehicles in flexographic and gravure inks. Maleic modified rosin-esters often exhibit good pigment wetting, gloss retention, color retention and adhesion. These esters are prepared from rosin, maleic anhydride and polyols, as for example glycerol or pentaerythritol. In order to get these materials energy curable, acrylic groups have to be attached to the free hydroxyl groups in the rosin esters. The hydroxyl groups in the resins derived from natural products are often sterically hindered, for example due to the bulky rosin moieties in rosin esters. Therefore, the acrylation with acrylic acid is difficult, since severe reaction conditions are necessary, often causing an undesired polymerization of the acrylic functions at high temperatures, due to their thermal instability. Thus, an introduction of acrylic groups under mild conditions is required.

There are various approaches in literature to introduce resins derived from natural products into energy curable materials. In many publications, the principle is to modify these materials prior to esterification in order to increase the reactivity towards the acrylation agents. Some patents disclose the reaction of a rosin with epoxides, e.g., ethylene oxide and subsequent reaction with acrylic acid. Another patent describes the reaction of fumarated rosin with glycidyl acrylate (JP A-591701650). These products are normally low molecular weight compounds. Yet another publication describes the esterification of fumarated rosin esters with hydroxyethyl acrylate at high temperatures above 200° C. (WO 87/04448, see Examples 3 and 6). At that temperature, there is a high risk of polymerization of acrylated functions even in the presence of an inhibitor.

Japanese Patent Application S58-160313 discloses a photosetting resin that is composed of a disproportionated rosin-modified urethanated unsaturated resin containing as binder components (1) 100 weight parts of a disproportionated rosin with an abietic acid content of 1% (wt %; the same applies hereinafter) or less, (2) 20 to 100 weight parts polyvalent isocyanate, and (3) 10 to 60 weight parts polyfunctional alcohol, having one or more polymerizable unsaturated groups per molecule, and having a hydroxyl value of no more than 80. A reactive diluent such as a (meth)acryloyl compound (which indicates meth and/or acryloyl compounds) or a vinyl group-containing compound can be added.

Japanese Patent Application S58-160313 also discloses a reaction scheme used in forming the photosetting resin by simultaneously or successively sterifying a specified amounts of a disproportionated rosin, a non-resin carboxylic acid and a polyfunctional alcohol. This is followed by a urethanation reaction which is brought about by an isocyanate. Alternatively, an isocyanate is reacted with an hydroxyalkyl acrylate to form an acrylated isocyanate followed by the addition of the disproportionated rosin. The disproportionated rosin referred to herein above is a modified rosin mainly obtained, for example, by reacting rosin with an abietic acid using a catalyst such as iodine, sulfur, or selenium at a temperature of 200° C. or higher, and this modified rosin has better stability because it contains fewer conjugated double bonds. The reason the degree of disproportionation is indicated by the amount of abietic acid contained is that an isomer having conjugated double bonds such as palustric acid or neoabietic acid changes into abietic acid in the course of disproportionation. The disproportionated character in this resin was disclosed to be critical in that its presence increases the storage stability of the photosetting resin without compromising the photocurability, increase gloss due to higher affinity with pigments, increases emulsification resistance by making the resin more hydrophobic, and makes it easier to clean the rollers of a printer due to better solubility in aliphatic hydrocarbons, among other benefits.

SUMMARY OF THE INVENTION

The present invention provides a method of acrylating a resin containing one or more hydroxyl functional groups and derived from a natural product, comprising preparing a mixture of a hydroxyalkyl acrylate and an isocyanate; and reacting said mixture with said resin.

DETAILED DESCRIPTION OF THE INVENTION

It has now been surprisingly found that the introduction of acrylic functions into high molecular resins derived from natural products under mild conditions is possible. Resins derived from natural products are defined herein as resins that contain mostly sterically hindered hydroxyl groups and thus traditionally prove to be hard to acrylate under mild conditions. Acrylated natural resins have a variety of use including in various ink formulations.

Isocyanate groups generally exhibit a much higher reactivity towards hydroxyl groups than carboxylic acid derivatives. Therefore, the acrylation reaction can be carried out under much milder conditions than usual. Thus, strong sterically hindered hydroxyl functions in resins can be acrylated with this method, which is difficult by direct acrylation with acrylic acid or hydroxyalkyl acrylates. The use of an energy curable crosslinker in the reaction mixture provides a solvent free reaction and avoids the use of a solvent during the reaction, which is difficult to remove later and undesired in energy curable mixtures. The use of an energy curable crosslinker also improves the crosslinking density, if the product is cured later in the application process, compared to the use of a reactive diluent. Preferably, higher hydroxyalkyl acrylates are used because of their good toxicological properties when compared to 2-hydroxyethyl acrylate, which is usually used.

Briefly, according to the present invention, natural resins are acrylated by a mixture of hydroxyalkyl acrylates and diisocyanates. The hydroxyalkyl acrylates react first with the diisocyanates, forming an intermediate and the remaining isocyanate groups of the intermediate react then with the hydroxyl groups of the natural resin, preferably at a temperature of about 25° C. to about 125° C. In this way acrylate groups are attached to the resin under mild conditions. The reaction is solvent-free. In case the viscosity of the reaction-mixture is too high, the reaction can be carried out in a reactive diluent. However, preferred is the use of an energy curable liquid crosslinker in order to avoid any solvent. Environment-friendly, non-toxic hydroxyalkyl acrylates are preferred. This will later impart the printing ink containing the acrylated natural resin an excellent solvent resistance, improved mechanical properties and outstanding outdoor weatherability, due to a high crosslinking density.

Preferably, the natural resin is an ester rosin resin that is not disproportionated. More preferably, the rosin ester resin is a maleated rosin that is prepared by reaction a rosin resin with maleic anhydride before acrylation.

In one embodiment, the reactive diluent or crosslinker, the diisocyanate, the rosin ester and a catalyst are mixed all together and heated to about 80-100° C. for several hours. As the reactivity of the hydroxyalkyl acrylates towards the isocyanate is higher than the rosin ester, the isocyanate will first react with the hydroxyalkyl acrylates and then with the rosin ester, so that the properties of the products are comparable to the two step process described above.

As indicated above, the acrylation reaction may be carried out in the presence of an energy curable reactive diluent. Preferably, the reactive diluent is a monofunctional acrylate. More preferably, the monofunctional acrylate is selected from the group consisting of 2-ethylhexyl acrylate, decyl acrylate, lauryl acylate, stearyl acrylate, adamantyl acrylate, phenoxyethyl acylate, b-carboxyethyl acylate, dicyclopentenyloxy acylate, poly(propeleneglycol) monoacrylate and poly(ethyleneglycol) monoacrylate.

As discussed above, the acrylation reaction can also be carried out in the presence of an energy curable reactive crosslinker. Preferably, the energy curable reactive crosslinker is a multifunctional acrylate. More preferably, the multifunctional acrylate is selected from the group consisting of 1,2-ethanediol diacrylate, 1,3-propanediol diacrylate, 1,4-butanediol diacrylate, 1,6-hexanediol diacrylate, dipropylene glycol diacrylate, neopentyl glycol diacrylate, ethoxylated neopentyl glycol diacrylate, propoxylated neopentyl glycol diacrylate, tripropylene glycol diacrylate, bisphenol-A-diglycidyl ether diacrylate, hydroxypivalic acid neopentanediol diacrylate, ethoxylated bisphenol-A-diglycidyl ether diacrylate, polyethylene glycol diacrylate, trimethylolpropane triacrylate, ethoxylated trimethylolpropane triacrylate, propoxylated trimethylolpropane triacrylate, propoxylated glycerol triacrylate, tris(2-acryloyloxyethyl) isocyanurate, pentaerythritol triacrylate, ethoxylated pentaerythritol triacrylate, pentaerythritol tetraacrylate, ethoxylated pentaerythritol tetraacrylate, ditrimethylolpropane tetraacrylate, dipentaerythritol pentaacrylate and dipentaerythritol hexaacrylate.

In the acrylating method of the present invention, the initial preparation of a mixture of a hydroxyalkyl acrylate and an isocyanate can be carried out with or without the presence of a catalyst. Typical catalysts are those known in literature as good catalysts for the alcohol isocyanate reaction for example tin organic materials such as dibutyltin dilaureate.

The hydroxyalkyl acrylate that is used in the method of the present invention can vary and by way of non-limiting example is selected from the group consisting of 4-hydroxybutyl acrylate, 10-hydroxydecyl acrylate, 2-hydroxyethyl acrylate and 2-hydroxypropyl acrylate.

The isocyanate that is used in the method of the present invention can vary and by way of non-limiting example is selected from the group consisting of toluene diisocyanate, diphenylmethane diisocyanate, hexamethylene diisocyanate, isophorone diisocyanate, xylidene diisocyanate and naphthalene diisocyanate.

EXAMPLE 1

Synthesis of Rosin Esters

Rosin resin (693 g) (Unitol NCY, Lot No. C15-145) was placed in a 2 l flask and stirred under nitrogen for 90 minutes at a temperature of 180° C. Then, maleic anhydride (63 g, Huntsman, Lot NQ2170) was added. The temperature was maintained at 180° C. for 15 minutes, then raised to 215° C. and stirred at that temperature for 1 hour. Then, a mixture of pentaerythritol (144 g, Perstorp) and magnesium oxide (0.60 g, Aldrich) was added in small portions. After the addition was complete, the temperature was raised to 260-270° C. and the reaction mixture was stirred until the acid value decreased to 30 mg KOH/g.

EXAMPLE 2

Ethoxylated neoplentylglycol diacrylate (120 g) was purged with air and mixed with toluene diisocyanate (52 g, Mondor TD 80), dibutyltin dilaureate (0.30 g) and hydrochinon monomethyl ether (0.30 g). Then, into this solution 4-hydroxybutyl acrylate (65 g) was dropped within 20 minutes, whereas the temperature raised to 70° C. The mixture was allowed to stir for 3 hours at 70° C. Then, finely grind rosinester (83 g), prepared according to Example 1, was added in small portions, so that no lumps occurred. After the addition, another amount of dibutyltin dilaureate (0.3 g) was incorporated and the mixture was stirred at 80° C., until the N—C—O-Signal in the IR-spectroscopy vanished. This took about 2.5 hours. Acid value of the resulting resin was measured at 6 mg KOH/g and the viscosity at 11 Pas@60C.

EXAMPLE 3

A mixture of isobornyl acrylate (57 g), toluene diisocyanate (25 g), dibutyltin dilaureate (50 mg) and hydrochinone monomethylether (50 mg) was purged with air. Then, 4-hydroxybutyl acrylate (31 g) was added over a period of 20 minutes, whereas the temperature raised up to 40° C. The solution was allowed to stir for 25 hours at room temperature. Then, finely grind rosin ester (42 g), prepared according to Example 1, was added in small portions. The rosin ester dissolved upon stirring. Then, dibutyltin dilaureate (150 mg) was added and the temperature was increased to 65-70° C. The reaction-mixture was kept at that temperature until the NCO-signal at about 2260 cm−1 in IR-spectroscopy disappeared. The Acid value of the resulting resin was measured at 15 mg KOH/g and the viscosity at 2.1 Pas@60C.

EXAMPLE 4

Toluene diisocyanate (174.0 g, Mondor T 80) was dissolved in ethoxylated trimethylol propane triacrylate (400 g). Dibutyltin dilaureate (1.0 g) and hydrochinon monomethylether (0.4 g) were added and the solution was purged with air. Then, 4-hydroxybutyl acrylate (210 g) was added dropwise to the solution over a period of 1 hour. The mixture was allowed to stir overnight at room temperature. The next morning, finely grind rosin ester (220 g), prepared according to Example 1 was added portionwise at 70° C., so that no big lumps occur. After the addition was complete, the mixture was allowed to stir at 80° C. for 2 hours. The Acid value of the resulting resin was measured at 8 mg KOH/g and the viscosity at 1.0 Pas@50.

The invention has been described in terms of preferred embodiments thereof, but is more broadly applicable as will be understood by those skilled in the art. The scope of the invention is only limited by the following claims.

What is claimed is:

1. An acrylated resin made by the method comprising preparing a mixture of a hydroxyalkyl acrylate and a polyfunctional isocyanate; and reacting said mixture with rosin ester resin derived from a natural product and which contains more than one hydroxyl functional group and is not a disproportionated rosin resin.

2. The acrylated resin method of claim 1, wherein said rosin ester resin is a maleated rosin that is prepared by reaction of a rosin resin with maleic anhydride.

3. The acrylated resin of claim 1, wherein said reaction is carried out in the presence of an energy curable reactive diluent.

4. The acrylated resin of claim 3, wherein said energy curable reactive diluent is a monofunctional acrylate.

5. The acrylated resin of claim 4, wherein said monofunctional acrylate selected from the group consisting of 2-ethylhexyl acrylate, decyl acrylate, lauryl acrylate, stearyl acrylate, adamantly acrylate, phenoxyethyl acrylate, b-carboxyethyl acrylate, dicyclopentenyloxy acrylate, poly(propyleneglycol)monoacrylate and poly(ethyleneglycol) monoacrylate.

6. The acrylated resin of claim 4, wherein said reaction is carried out in the presence of an energy curable crosslinker.

7. The acrylated resin of claim 6, wherein said energy curable reactive crosslinker is a multifunctional acrylate.

8. The acrylated resin of claim 7, wherein said multifunctional acrylate is selected from the group consisting of 1,2-ethanediol diacrylate, 1,3-propanediol diacrylate, 1,4-butanediol diacrylate, 1,6-hexanediol diacrylate, dipropylene glycol diacrylate, neopentyl glycol diacrylate, ethoxylated neopentyl glycol diacrylate, propoxylated neopentyl glycol diacrylate, tripropylene glycol diacrylate, bisphenol-A-diglycidyl ether diacrylate, hydroxypivalic acid neopentanediol diacrylate, ethoxylated bisphenol-A-diglycidyl ether diacrylate, polyethylene glycol diacrylate, trimethylolpropane triacrylate, ethoxylated trimethylolpropane triacrylate, propoxylated trimethylolpropane triacrylate, propoxylated glycerol triacrylate, tris(2-acryloyloxyethyl)isocyanurate, pentaerythritol triacrylate, ethoxylated pentaerythritol triacrylate, pentaerythritol tetraacrylate, ethoxylated pentaerythritol tetraacrylate, ditrimethylolpropane tetraacrylate, dipentaerythritol pentaacrylate and dipentaerythritol hexaacrylate.

9. The acrylated resin of claim 1, wherein the preparation of mixture of hydroxyalkyl acrylate and an isocyanate is carried out in the presence of a catalyst.

10. The acrylated resin of claim 9, wherein said catalyst is dibutyl tin dilaureate.

11. The acrylated resin of claim 1, wherein said hydroxyalkyl acrylate is selected from the group consisting of 4-hydroxybutyl acrylate, 10-hydroxydecyl acrylate, 2-hydroxyethyl acrylate and 2-hydroxypropyl acrylate.

12. The acrylated resin of claim 11, wherein said isocyanate is selected from the group consisting of toluene diisocyanate, diphenylmethane diisocyanate, hexamethylene diisocyanate, isophorone diisocyanate, xylidene diisocyanate and naphthalene diisocyanate.

13. The acrylated resin of claim 1, wherein said isocyanate is selected from the group consisting of toluene diisocyanate, diphenylmethane diisocyanate, hexamethylene diisocyanate, isophorone diisocyanate, xylidene diisocyanate and naphthalene diisocyanate.

* * * * *